United States Patent [19]

Kawai et al.

[11] Patent Number: 5,017,757
[45] Date of Patent: May 21, 1991

[54] PULSED ARC WELDING MACHINE

[75] Inventors: Naoki Kawai, Ikeda; Koji Hamamoto, Takarazuka; Masahiro Minooka, Osaka, all of Japan

[73] Assignee: Matsushita Electric Industrial Co., Ltd., Osaka, Japan

[21] Appl. No.: 502,774

[22] Filed: Apr. 2, 1990

[30] Foreign Application Priority Data

Apr. 10, 1989 [JP] Japan .................................. 1-90127

[51] Int. Cl.$^5$ ............................................. B23K 9/09
[52] U.S. Cl. ........................ 219/130.51; 219/137 PS
[58] Field of Search ...................... 219/130.51, 137 PS

[56] References Cited

U.S. PATENT DOCUMENTS 3,622,744 11/1971 Main et al. ..................... 219/130.51
4,497,997 2/1985 Bodewig ......................... 219/130.51

Primary Examiner—Clifford C. Shaw
Attorney, Agent, or Firm—Wenderoth, Lind & Ponack

[57] ABSTRACT

In a pulse arc welding machine which is adapted to feed at a constant speed a welding wire as a waste electrode to turn the molten lump of the wire tip end into a spray state with a pulse current so as to effect a welding operation, the risetime and falltime of the pulse current influence the bead outer appearance, the gas shielding property and welding function and are varied independently of the other parameters controlled by the machine in accordance with the material quality of the welding wire, the wire diameter, and the wire feeding speed.

3 Claims, 4 Drawing Sheets

Fig. 3
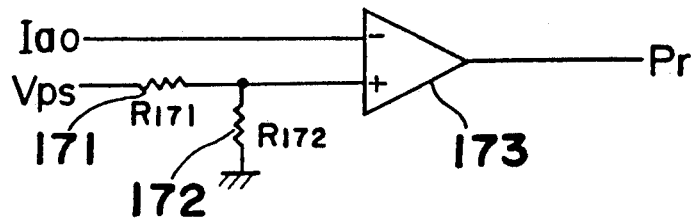
Fig. 4
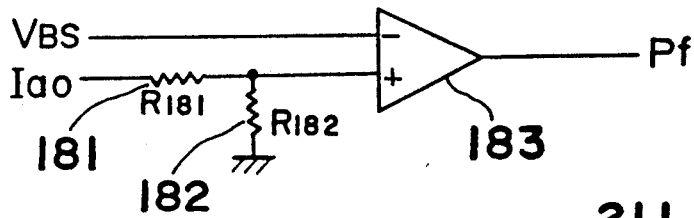
Fig. 5
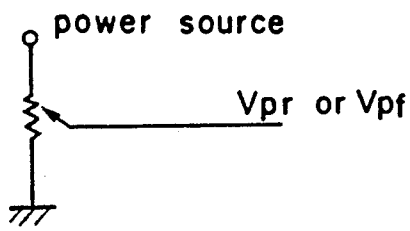
Fig. 6
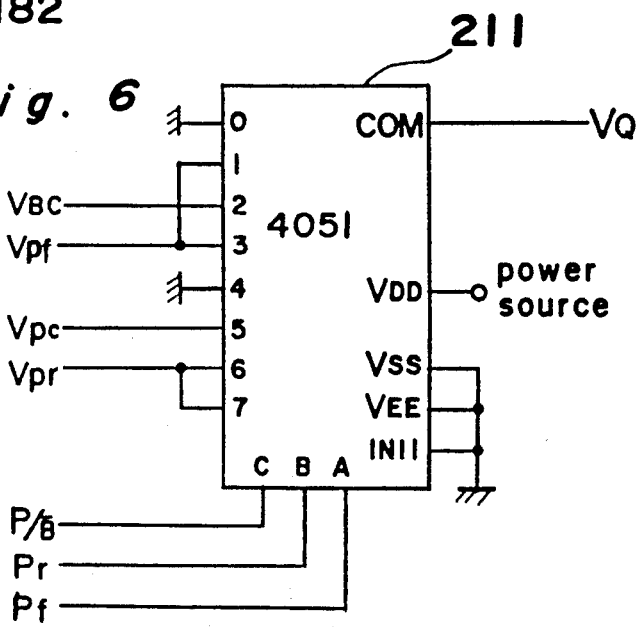
Fig. 7
| CONTROL | INPUTS | | | ON CHANNEL |
|---|---|---|---|---|
| INHIBIT | C | B | A | |
| L | L | L | L | 0 |
| L | L | L | H | 1 |
| L | L | H | L | 2 |
| L | L | H | H | 3 |
| L | H | L | L | 4 |
| L | H | L | H | 5 |
| L | H | H | L | 6 |
| L | H | H | H | 7 |
| H | ✕ | ✕ | ✕ | NONE |
✕ = DON'T CARE

PULSED ARC WELDING MACHINE

BACKGROUND OF THE INVENTION

The present invention generally relates to a pulse arc welding machine which is adapted to feed at a constant speed a welding wire as a waste electrode to turn the molten lump of the wire tip end into a spray state by a pulse current so as to effect an welding operation.

In a pulse arc welding machine which effects the constant-current control of both the conventional pulse peak current portion and base current portion, a rising grade of the pulse current from the base current portion to the pulse peak current portion and a lowering grade of the pulse current from the pulse peak current portion to the base current portion are determined by the transient characteristics of the reactor connected with the main circuit of the welding with the welding output controlling element being made full conductive or full non-conductive. In the conventional method, it is difficult to easily control the value of the reactor minutely. Under the existing circumstances, an intermediate terminal is provided on the reactor so as to cope with the problem on the spot through the manual switching operation of it especially when a problem exists with the rising, lowering grades of the same pulse current in the value of the same reactor with respect to the combination of the material quality of the welding wire, the wire diameter, the wire feeding speed.

The rising grade, the lowering grade of the pulse current apply influences upon the bead outer appearance, the gas shielding property and the welding function in accordance with the material quality of the welding wire, the wire diameter, the wire feeding speed.

The mild steel wire in the shield gas of, for example, argon+$CO_2$ whose globules are hard to spray requires the pulse current which is larger in the grade. When the grade is small, the spraying operation is not smoothly promoted. In the wire of pure aluminum or the like which is extremely easy to spray, the bead outer appearance becomes worse, the gas shielding property is also damaged when the pulse current of the excessive grade is given, so that black oxide is likely to be separated on the bead surfaces. In the region where the average value of the welding current is a spray critical current or lower, the spraying operation has to be promoted with the pulse current larger in the grade. In the region where the average value of the welding current is a spray critical current or more, the spraying operation is easily effected, with a result that the rising, lowering grades of the excessive pulse current damage the bead outer appearances.

SUMMARY OF THE INVENTION

Accordingly, the present invention has been developed with a view to substantially eliminating the above-discussed drawbacks inherent in the prior art pulse arc welding machines, and has for its essential object to provide an improved pulse arc welding machine taking advantage of the merits of the prior art pulse arc welding machines.

Another important object of the present invention is to provide an improved pulse arc welding machine of the type referred to above, wherein the rising grade and the lowering grade of the pulse current are independently regardless of the other controlling operations, the rising, lowering grades of the optimum pulse current may be easily set automatically in accordance with the material quality of the welding wire, the wire diameter, the wire feeding speed, in a pulse arc welding machine having the pulse peak and the base portion controlled in the constant current.

In accomplishing these and other objects, according to one preferred embodiment of the present invention, there is provided a pulse arc welding machine for effecting the constant-current-controlling of the pulse peak portion and the base portion, which includes a welding current value detecting portion for detecting the welding current so as to output the welding current value signal, a pulse period controlling portion for outputting a pulse period signal to change the condition at a period from the rising start of the pulse current to the lowering start of the pulse current and the other periods, a pulse peak controlling circuit portion for outputting a pulse peak controlling signal to constant-current-control the pulse peak portion so as to become the given current with the pulse peak current setting signal from the pulse peak current setter being provided as the input, a base controlling circuit portion for outputting a base controlling signal to constant-current-control the base portion so as to become the given current with the base current setting signal from the base current setter being provided as the input, and which comprises a pulse peak portion detecting portion for outputting a pulse peak portion detecting signal to change the condition at a time when the welding current has reached a value a little lower than the predetermined pulse peak current or higher with the welding current value signal and the pulse peak current setting signal being provided as the inputs, and at a time when the welding current has not reached it, a base portion detecting portion for outputting a base portion detecting signal to change the condition in a case where the welding current is a value a little higher than the predetermined base current or higher, and lower with the welding current value signal and the base current setting signal being provided as the inputs, a pulse rising controlling portion for outputting a pulse rising controlling signal for controlling the rising grade of the pulse current from the base current to the pulse peak current, a pulse lowering control portion for outputting a pulse lowering control signal for controlling the lowering grade of the pulse current from the pulse peak current to the base current, a selecting circuit portion for outputting a driving circuit portion to drive the welding output controlling element, selecting as a driving signal one of the pulse peak controlling signal, the base controlling signal, the pulse rising controlling signal and the pulse lowering control signal through the combination of the condition of the pulse period signal, the pulse peak portion detecting signal and the base portion detecting signal. Since a period from the rising start of the pulse current to the pulse peak current, a period of the pulse peak current portion, a period from the lowering start of the pulse current to the base current, a period of the base current, and four types of periods may be definitely divided by the means, so that the optimum controlling operation may be effected independently of the other periods at the respective periods. In the pulse arc welding machine which has been controlled in the constant current by the conventional pulse peak portion, base portion, the rising grade and the lowering grade of the pulse current may be optionally controlled independently in addition to the conventional one.

BRIEF DESCRIPTION OF THE DRAWINGS

FIG. 3 is a concrete circuit diagram of a pulse peak portion detecting portion;

FIG. 4 is a concrete circuit diagram of a base portion detecting portion;

FIG. 5 is a concrete circuit diagram of a pulse rising controlling portion or a pulse lowering controlling portion;

FIG. 6 is a concrete circuit diagram of a selecting circuit portion;

FIG. 7 is a chart showing an operation true value table of a 4051 type IC;

FIG. 9 is a concrete circuit diagram of a pulse rising controlling portion or a pulse lowering controlling portion in a case where the pulse rising controlling signal or the pulse lowering controlling signal is varied by the setting combination of the wire material quality, the wire diameter, the wire feeding speed, the welding voltage and so on.

DETAILED DESCRIPTION OF THE INVENTION

Figure 1:
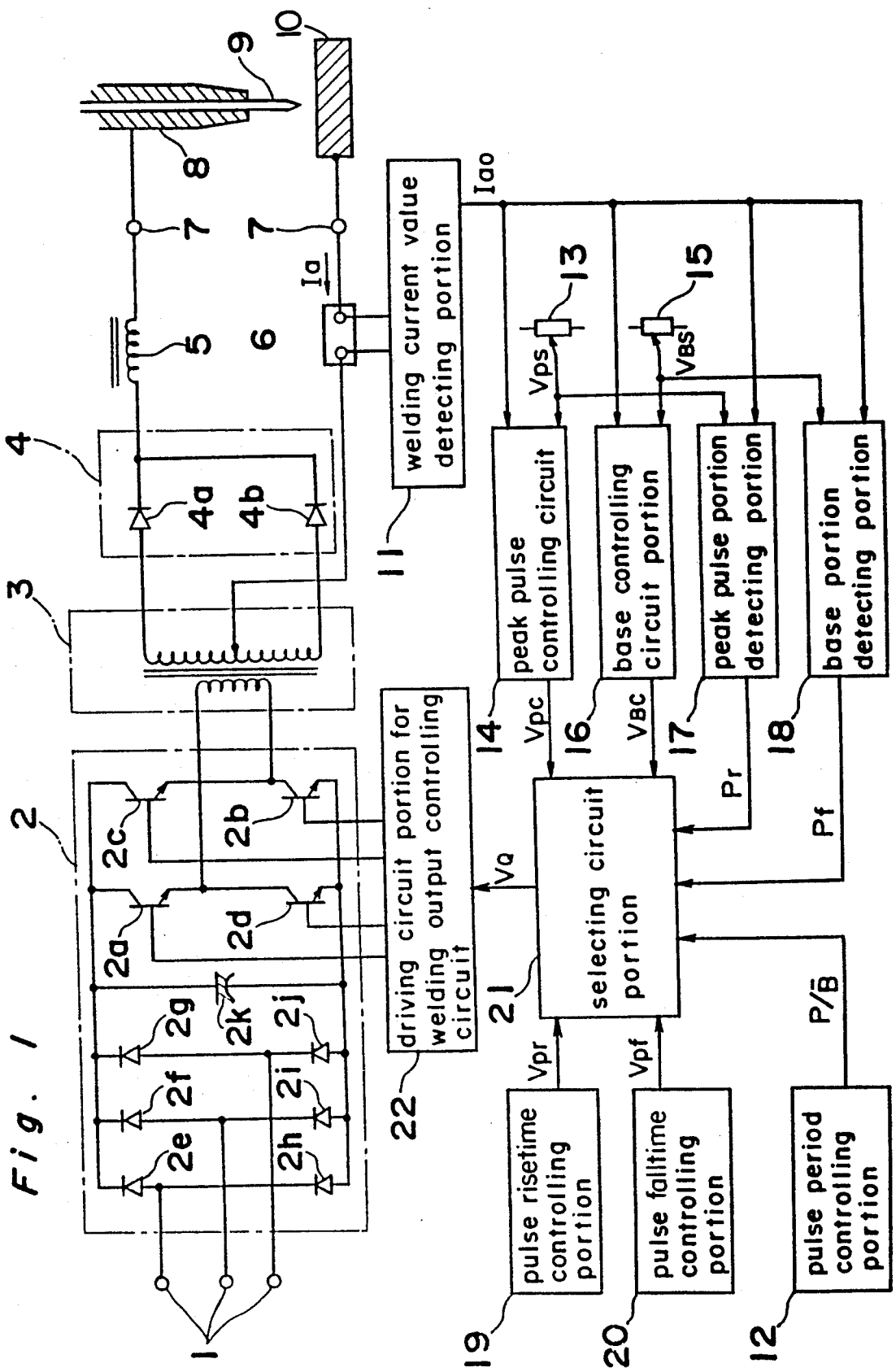
FIG. 1 is a circuit diagram of a pulse arc welding machine showing the embodiment of the present invention.

Before the description of the present invention proceeds, it is to be noted that like parts are designated by like reference numerals throughout the accompanying drawings.

Referring now to the drawings, there is shown in FIG. 1, a pulse arc welding machine according to one preferred embodiment of the present invention, which includes a welding machine input terminal 1, an inverter- constructed welding output controlling portion 2 with transistors as welding output controlling elements 2a through 2d, diodes 2e through 2j, a capacitor 2k provided therein, a main transformer 3, a secondary rectifying portion 4 with diodes 4a, 4b provided in it, a rector 5, a shunt 6, a welding machine output terminal 7, a contact chip for energization use 8, a wire for welding use 9, a base metal as a welded 10, a welding current value detecting portion 11 with Iao being a welding current value signal as the output thereof, a pulse period controlling portion 12 with a pulse period signal as the output thereof, a pulse peak current setter 13 with VPs being a pulse peak current setting signal as the output thereof, a pulse peak controlling circuit 14 with VPc being a pulse peak controlling signal as the output thereof, a pulse current setter 15 with VBs being a base current setting signal as the output thereof, a base controlling circuit portion 16 with VBc being a base controlling signal as the output thereof, a pulse peak portion detecting portion 17 with Pr being a pulse peak portion detecting signal as the output thereof, a base portion detection portion 18 with Pf being a base portion detecting signal as the output thereof, a pulse rising controlling portion 19 with VPr being a pulse rising controlling signal as the output thereof, a pulse lowering controlling portion 20 with VPf being a pulse lowering controlling signal as the output thereof, a selecting circuit portion 21 with VQ being a driving signal as the output thereof, a driving circuit portion for a welding output controlling circuit 22.

The operation of FIG. 1 will be described with the use of a timing chart of FIG. 2. The reference characters of the indexes of the respective signals of FIG. 2 conform to the reference characters described in FIG. 1. A pulse period signal P/B from a pulse period controlling portion 12 is a signal at a H level in a period from a time t0 of the rising start of the pulse current to the time t3 of the lowering start of the pulse current, and a signal at a L level in the other period. In the conventional pulse arc welding machine, this signal is composed of a portion corresponding to the pulse period controlling portion 12 including the element of the feedback control of the welding voltage as a discriminating signal of the pulse base portion. The pulse peak portion detecting signal Pr from the pulse peak portion detecting portion 17 is at a L level between a time t2 exceeding a value RPr a little lower than the pulse peak current IP at the welding current Ia or the welding current value signal Iao of FIG. 2, and is a signal at a H level at the other period. This may be easily realized by a comparing circuit with a comparator 173 as shown in the embodiment of FIG. 3. The value of RPr with respect to the IP is determined by the values of the resistors 171, 172 of FIG. 3. In the actual designing, the RPr is selected so as to become a value which is extremely closer to the IP a little lower than the IP. The base portion detecting signal Pf from the base portion detecting portion 18 is a signal which becomes a L level between a time t5 below a value RPf which is a little larger than the base current IB at the welding current Ia and the time t1 of the next pulse period, and is a signal at a H level at the other period. This can be easily realized by the comparing circuit with a comparator 183 as shown in the embodiment of FIG. 4 as in the Pr. The value of RPf with respect to the IB is determined by the values of the resistors 181, 182 of FIG. 4. The selecting circuit portion 21 has three signals of the above-described pulse period signal P/B, a pulse peak portion detecting signal Pr, a base portion detecting signal Pf as the control inputs. This is outputted as a driving signal VQ through the selection of a pulse peak controlling signal VPc, a base controlling signal VBc, a pulse rising controlling signal VPr or a pulse lowering controlling signal VPf through the combination of the H level, the L level of these signals. The portion shown in oblique lines in the signals of VPc, VBc, VPr, VPf of FIG. 2 form the VQ signal with the portion being selected. Namely, in FIG. 2, a pulse rising controlling signal VPr is selected at the t02 period from a time t0 to a time t2, a pulse peak controlling signal VPc is selected at a t23 period from a time t2 to a time t3, a pulse lowering controlling signal VPf is selected at a t35 period from a time t3 to a time t5, a base controlling signal VBc is selected at the t56 period from a time t5 to a time t6 so as to be outputted as the driving signal VQ signal. Such a selecting circuit portion 21 is easily realized by a generalized CMOS model IC of 4051 model IC211 shown in FIG. 6. The 4051 model IC211 is an IC called an analog multiplexer and shows a true value table described in a handbook of FIG. 7.

A pulse peak controlling circuit portion 14 for outputting a pulse peak controlling signal VPc effects a feedback controlling operation by a portion for comparing the pulse peak current setting signal VPs with a welding current value signal Iao so as to effecting calculating, amplifying operations, so that it may become a pulse peak current IP equivalent to the given VPs signal. Accordingly, the pulse peak controlling signal VPc at the period t23 becomes an oscillation waveform as shown in FIG. 2 and is uncertain by the condition of the welding portion. The pulse peak controlling circuit portion 14 for outputting the oscillation waveform by such feedback is contained without fail in a pulse arc welding machine for electronically controlling the pulse peak in the constant current.

The base controlling circuit portion 16 for outputting the base controlling signal VBc is also omitted in description due to the same reason as the pulse peak controlling circuit portion 14 has. Although these pulse peak controlling circuit portion 14 and the base controlling circuit portion 16 are provided even in the pulse arc welding machine which are realized by the same comparator, calculation amplifier, this is included in the purpose of the present application with the VPc and the VBc collected being outputted.

As shown in FIG. 5, the pulse rising controlling portion 19 and the pulse lowering controlling portion 20 for outputting a pulse rising controlling signal VPr and a pulse lowering controlling signal VPf are easily realized by the variable resistor. The rising grade and the lowering grade of the pulse current may be easily varied, adjusted by the setting of the variable resistor. Also, it may be easily realized by the present invention that the values of the VPr, VPf may be unificated into an optimum value in accordance with the material quality of the welding wire, the wire diameter, the wire feeding speed.

Figure 2:
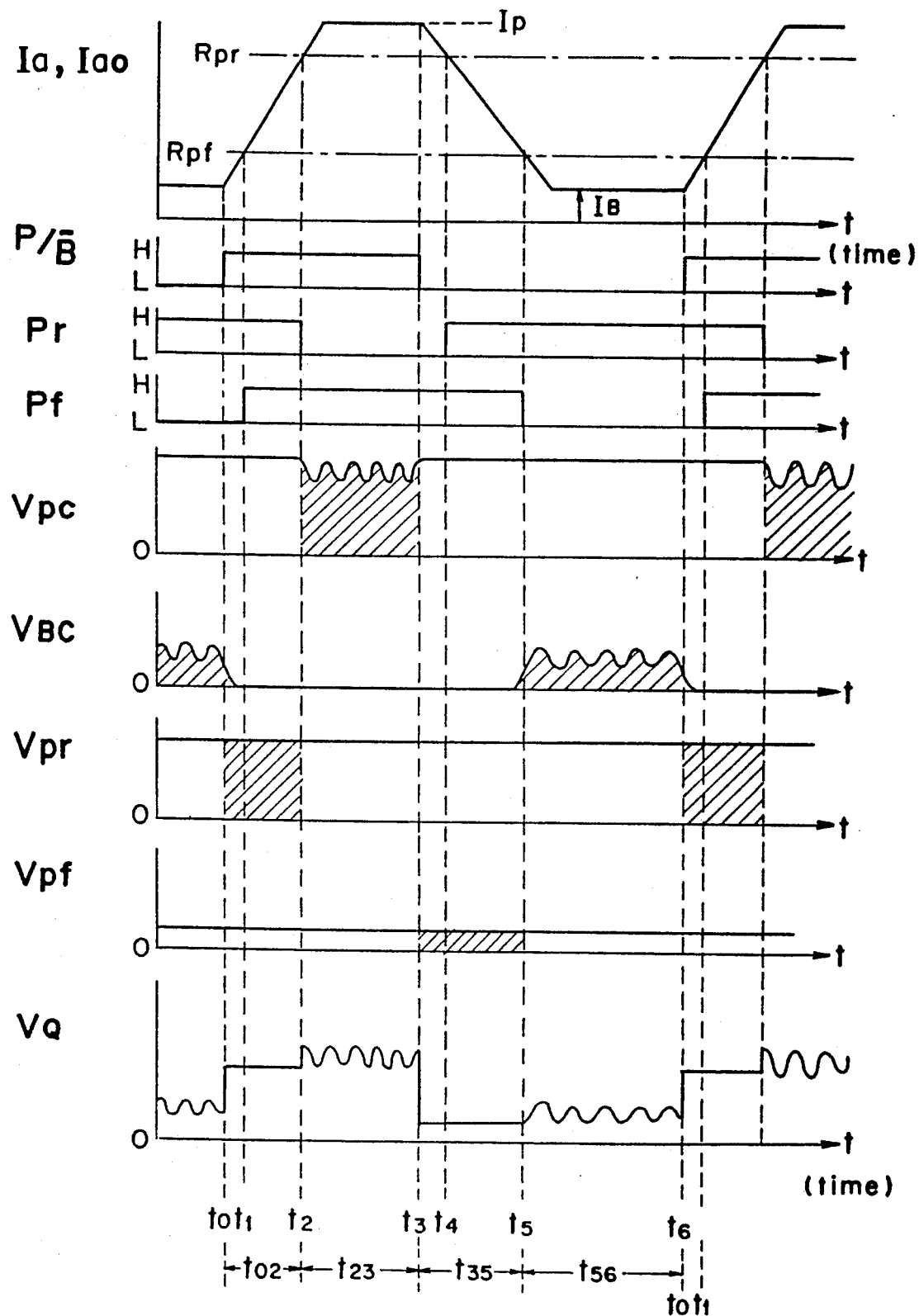
FIG. 2 is a time chart showing an operation timing of a signal of each portion in FIG. 1.

The driving circuit portion 22 receives the output signal VQ from the selecting circuit portion 21 from the above-described operation so as to control the on-off switching ratio of the welding output controlling elements 2a through 2d in accordance with the size of the value of the VQ signal so that such welding current waveform shown in the Ia of FIG. 2 may be obtained, the rising or lowering grade of the pulse current may be adjusted independently regardless of the other controllings in accordance with the size of the pulse rising controlling signal VPr and the pulse lowering controlling signal VPf.

In the Ia, Iao waveforms of FIG. 2, the value of the RPr is considered to be close as much as possible to IP, the value of the RPf is considered to be closer as much as possible to IB by the circuit example to be embodied, the conditions of RPf=IP, PPf=IB are also within the range of the present invention. Namely, four types of period (t02 period of FIG. 2) from the rising start of the pulse current to the pulse peak current IP, a duration (t23 period of FIG. 2) of the pulse peak current IP, a period (t35 period of FIG. 2) from the lowering start of the pulse current to the base current IB, a duration (t56 period of FIG. 2) of the base current IB are discriminated, with a purpose of the present invention that the signal is switched so that the welding output controlling operation is effected into an optimum value independently at each period, and the welding output is controlled by the same welding output controlling element.

Figure 8:
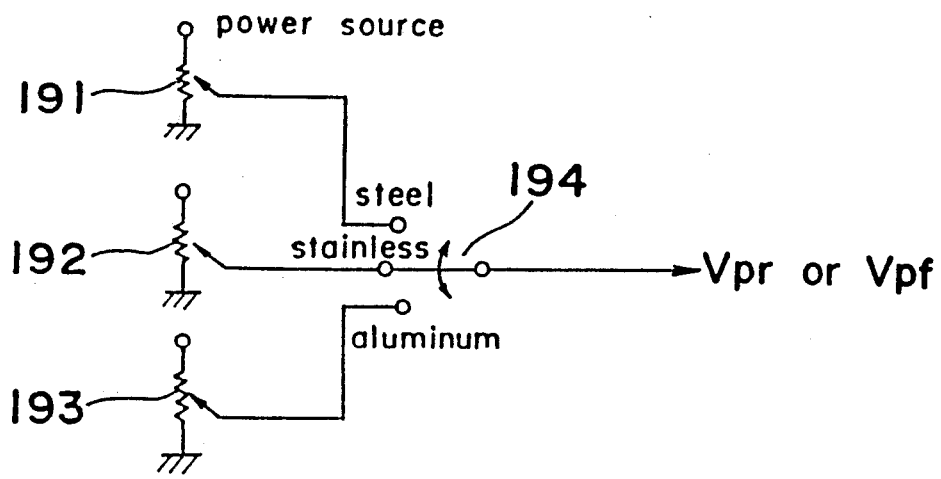
FIG. 8 is an essential portion circuit diagram when a switching function has been added for each wire material quality on a pulse rising controlling portion or a pulse lowering controlling portion.
Figure 9:
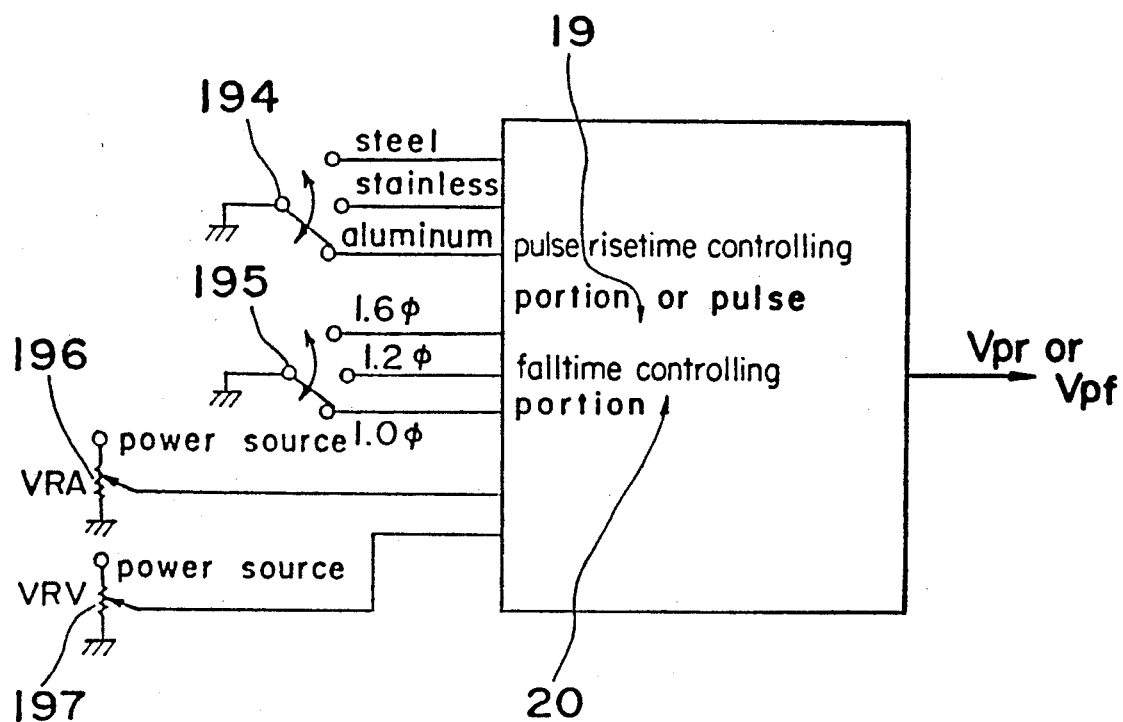

As the applied expansion of the present invention, respective adjustors 191 through 193 are provided for each of the wire material quality by a wire material quality change-over switch 194 as shown in FIG. 8, so that the pulse rising controlling signal VPr or the pulse lowering controlling signal VPf which are different for each of the wire material quality may be provided. As shown in FIG. 9, a wire material quality change-over switch 194, a wire diameter change-over switch 195, a wire feeding speed adjustor 196, a welding voltage adjustor 197 and so on are connected with a pulse rising controlling portion 19 or a pulse lowering controlling portion 20. By the combination of the signals of the change-over switches 194, 195, the adjustors 196, 197, the optimal pulse rising controlling signal VPr, pulse lowering controlling signal VPf in the respective combinations may be easily realized by the application of the art of the today's microcomputer and so on to the pulse rising controlling portion 19 or the pulse lowering controlling portion 20.

As is clear from the foregoing description, according to the arrangement of the present invention, in a pulse arc welding machine with a pulse peak portion and a base portion being controlled in the constant current, the rising grade of the pulse current and the lowering grade of the pulse current may be adjusted independently regardless of the other controllings, so that the rising grade and lowering grade of the pulse currents may be easily controlled, without the adjusting of the winding number, etc. of the reactor, in accordance with the material quality of the welding wire, the wire diameter, the wire feeding speed. A highly efficient welding machine may be provided which extends from a soft steel wire and so on that require the large pulse rising, lowering grades to a soft aluminum wire and so on that are required to maintain the bead outer appearance, the gas shielding property at the small grade. Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A pulse arc welding machine for controlling a peak pulse portion and a base portion of a welding current output therefrom, which includes: a welding current value detecting portion for detecting a welding current value so as to output a welding current value signal; a pulse period controlling portion for outputting a pulse period signal during a period from a leading edge of a pulse current of the welding current to a trailing edge of the pulse current; a peak pulse controlling circuit portion for outputting a pulse peak controlling signal from controlling a peak pulse portion of the welding current so as to maintain it at a preselected given current value using a peak pulse current setting signal output from a pulse peak current setter as an input thereto; a base controlling circuit portion for outputting a base controlling signal for controlling a base portion of the welding current so as to maintain it at a preselected given current value using a base current setting signal from a base current setter as an input thereto; the welding machine further comprising: a peak pulse portion detecting portion for outputting a peak pulse portion detecting signal at a time when the welding current has reached a value which is less than a preselected peak pulse current value using a welding current value signal and the peak pulse current setting signal as inputs thereto; a base portion detecting portion for outputting a base portion detecting signal at a time when the welding current is at a value which is a more than a preselected base current value using the welding current value signal and the base current setting signal as inputs thereto; a pulse rise time controlling portion for outputting a pulse risetime controlling signal for controlling a risetime of the pulse current from its base current value to its peak pulse current value; a pulse falltime controlling portion for outputting a pulse falltime controlling signal for controlling a falltime of the pulse current from its peak pulse current value to its base current value; a selecting circuit portion for outputting a driving signal for controlling a driving circuit portion for driving a welding output controlling element, said element controlling the value of the welding current; wherein said selecting circuit selecting as said driving signal one of the peak pulse controlling signal, the base controlling signal, the pulse risetime controlling signal and the pulse falltime controlling signal in accordance with the combination consisting of the pulse period signal, the peak pulse portion detecting signal and the base portion detecting signal so as to optimize the welding current value.

2. A pulse arc welding machine in accordance with claim 1, wherein the pulse risetime controlling means controls the value of said pulse risetime controlling signal in accordance with the combination consisting of input signals representing the material quality of the welding wire used by the machine; the welding wire diameter, and the wire feeding speed so that the risetime of the pulse current may be optimized.

3. A pulse arc welding machine in accordance with claim 1, wherein the pulse falltime controlling means controls the value of said pulse falltime controlling signal in accordance with the combination consisting of input signals representing the material quality of the welding wire used by the machine, the welding wire diameter, and the wire feeding speed so that the falltime of the pulse current may be optimized.

* * * * *